United States Patent [19]

Sowerby et al.

[11] Patent Number: 5,523,852
[45] Date of Patent: Jun. 4, 1996

[54] APPARATUS FOR SYNCHRONIZING THE OPERATION OF VIDEO DEVICES

[75] Inventors: Brian M. Sowerby, Bracknell; David J. Walton, Basingstoke, both of England

[73] Assignees: Sony Corporation, Tokyo, Japan; Sony United Kingdom, Ltd., Middelsex, England

[21] Appl. No.: 390,166

[22] Filed: Feb. 17, 1995

Related U.S. Application Data

[63] Continuation of Ser. No. 91,871, Jun. 30, 1993, abandoned.

[30] Foreign Application Priority Data

Aug. 21, 1992 [GB] United Kingdom ............... 9217837

[51] Int. Cl.⁶ .................... H04N 5/76; H04N 5/78
[52] U.S. Cl. .................... 358/335; 360/14.3; 360/33.1
[58] Field of Search ........................... 358/335, 310, 358/311; 360/13, 10.1, 14.1, 14.2, 14.3, 33.1, 35.1; 348/500; H04N 5/76, 5/78, 5/781, 5/782, 5/783, 9/79, 5/92, 5/765

[56] References Cited

U.S. PATENT DOCUMENTS

| | | | |
|---|---|---|---|
| 4,516,166 | 5/1985 | Tellone | 360/14.3 |
| 4,786,981 | 11/1988 | Sekimoto et al. | 360/14.3 |
| 4,858,027 | 8/1989 | Sashou et al. | 360/14.3 |
| 5,040,081 | 8/1991 | McCutchen | 360/14.3 |
| 5,146,448 | 9/1992 | Adachi et al. | 360/14.3 |

FOREIGN PATENT DOCUMENTS

| | | |
|---|---|---|
| 0354705 | 2/1990 | European Pat. Off. . |
| 2213749 | 8/1989 | United Kingdom . |

Primary Examiner—Thai Q. Tran
Attorney, Agent, or Firm—William S. Frommer; Alvin Sinderbrand

[57] ABSTRACT

For synchronising the operation of first and second video devices referenced by respective timecodes and operable at different video rates in response to first and second timing references where the first video rate is a m/n times the second video rate, a predetermined phase relationship is established between the first timecodes from the first video device and second reference signals for the second video device and then target timecodes for synchronising the second video device are derived from the first timecodes and the second reference signals. In a first embodiment second timing reference signals are generated with a fixed, repeatable phase relationship with respect to the first timecodes by resetting the timing of the second timing reference signals in response to a first timecode which, when divided by m, gives a predetermined remainder. In a second embodiment a phase relationship between internally generated first and second reference signals is determined and then the first video device is synchronised with the first reference signals.

29 Claims, 10 Drawing Sheets

APPARATUS FOR SYNCHRONIZING THE OPERATION OF VIDEO DEVICES

This application is a continuation of application Ser. No. 08/091,871, filed Jun. 30, 1993, now abandoned.

BACKGROUND OF THE INVENTION

1. Field of the Invention

This invention relates to video processing apparatus operable with a first video means for first series of video images referenced by means of first timecodes and a second video means for a second series of video images referenced by second timecodes. In particular, the invention relates to video processing apparatus which, in order to process video images associated with the first and second video means, includes control means for synchronising the operation of the first and second video means.

2. Description of the Prior Art

Professional video processing is typically performed using timecodes such that each frame (and/or field) of video in a video sequence is uniquely identified by a timecode. A timecode is typically defined in terms of hours: minutes: seconds: and frames. Optionally, the fields in interlaced video may be uniquely identified as well. Conventional professional video players and recorders can be instructed to proceed to a frame identified by a particular timecode and then to playback or to record from that frame in the sequence. When performing an edit, the video apparatus can be instructed to start an edit at a first timecode and to terminate the edit at a second timecode.

Professional video studios are typically provided with a standard reference source identifying a standard reference frequency for that studio. Typically the studio reference will either be 50 Hz, or 60 Hz. By supplying this reference to all the video units in the studio, the operation of those units can easily be synchronized. Thus, for example, where it is desired to perform an edit between a source video tape recorder (VTR) and a destination VTR using processing apparatus, the operation of the three units can be synchronised using the common studio reference.

If, for example, it is intended to use a sequence of video images on a tape in a source VTR to edit part of a sequence of video material on a tape in a destination VTR, this can be performed in the following manner. Each video frame and field on the tape is identified by means of timecodes. Accordingly, an edit controller can issue a command to a first one of the VTRs (eg. the source VTR) to go to a timecode "S1-d1 fields" and to switch to a play mode based on the standard studio reference. "S1" is the start timecode for the edit sequence on the first VTR and "d1" is a number of timecodes preceding the start timecode which allows the first VTR to lock to the reference and to synchronise the second VTR before reaching the start timecode S1.

The edit controller instructs the second (e.g. the destination) VTR to go to a timecode "S2-d2 fields" and to enter the play mode. The destination VTR spools to the point identified and starts to run based on the common studio reference. "S2" is the start timecode for the edit sequence on the second VTR and "d2" is a number of timecodes preceding the start timecode which allows the second VTR to get up to normal play speed and to be synchronised to the first VTR. In order to synchronise the running of the second VTR to that of the first VTR so that the fields of video information are in the correct relationship, the edit controller reads the timecodes from the first and second VTRs and computes the error between the timecodes. On the basis of the error signals, the edit controller sends commands to one of the VTRs to vary its speed until the timecodes are found to be in the correct relationship. After this the edit operation can be performed when the start timecodes have been reached.

The above process is relatively straightforward and is a standard part of conventional video processing. However, it assumes that both the source and destination VTR are operating in response to a common timing reference, so that the timing reference for the source and destination VTRs are in phase and accordingly that the timecodes for each frame and field of video information on the tapes of the source and destination VTRs are in a predetermined relationship as well.

However, situations exist where a source video device and a destination video device may not be operating in response to a common standard timing reference. One example of such a situation is where video standards conversion is effected between a source video device and a destination video device. When converting between a sequence of source video images at, fop example 60 Hz, and a sequence of video images at, for example 50 Hz, it is necessary to process the video signals (e.g. to effect motion compensation) in order to provide a high quality output. Many or the processes which can be performed can be adjusted in order to take account of the content of the source video images.

The operator of the video standards conversion equipment can therefore tailor the processing to be performed on the source video image in order to give optimum output video images. It is not an easy matter to tailor the processing of the input video images in such a manner that artifacts and undesired effects are eliminated from the output video sequence. Undesired effects can result from the movement of objects in the source video sequence. Due to the need to convert between video having 60 images per second to video having 50 images per second, the movement in the converted images may no longer be smooth or natural. For example, with one motion compensation algorithm, the stripes on the shirt of a person moving in the source video sequence may swim in the output video sequence. By applying a different processing algorithm to the images, it may well be possible to eliminate or mitigate this undesired effect.

However, to date, where such undesired effects have been observed in a video sequence output by a video standards converter, it has been necessary to reprocess the complete sequence of video images using modified video processing in order to avoid undesired effects. This is because it has not been possible to edit a section only of the video sequence which manifests the undesired effects due to the difficulty of accurately synchronising the operation of the source and destination video tape recorders to enable the edited portion to be inserted cleanly. As the source and destination video devices are driven at different frequencies in response to respective timing references, the phase relationship between the timecodes and the references varies from image to image within the video sequences. Having to reprocess the complete video sequence is an expensive and time consuming process. Also, although changing the video processing performed on the sequence may cure artifacts at one point in the sequence, the use of other processing operations can cause other artifacts to appear at other points in the sequence.

SUMMARY OF THE INVENTION

An object of the present invention is to provide video processing apparatus operable with a first video means for a first series of video images referenced by means of first timecodes and second video means for a second series of video images referenced by second timecodes where the first and second video means are operable at first and second video rates in response to first and second timing reference signals respectively, which video processing apparatus is able to synchronise the operation of the first and second video means.

In accordance with the present invention, there is provided a video processing apparatus comprising means for synchronising the operation of a first video means for a first series of video images referenced by means of first timecodes, the first video means being operable at a first video rate in response to first timing reference signals and a second video means for a second series of video images referenced by second timecodes, the second video means being operable at a second video rate in response to second timing reference signals, the apparatus comprising control means for establishing a predetermined phase relationship between the first timecodes from the first video means and second reference signals for the second video means and responding to the first timecodes and the second reference signals for the second video means to derive target timecodes for the second video means for synchronising the second video means.

By establishing a predetermined phase relationship between the first timecodes and the second timing reference signals, the control means is then able to use the first timecodes and the second timing reference signals to synchronise the operation of the second video means.

In accordance with one preferred embodiment of the invention the phase relationship is established in that the control means comprises second timing reference generator means responsive to the first timecodes from the first video means to generate second timing reference signals with a fixed, repeatable phase relationship with respect to the first timecodes, and timecode generating means responsive to the second timing reference signals and to the first timecodes to derive the target timecodes for the second video means.

Preferably, the second timing reference generator means comprises a reference signal generator and means for generating a reset signal for resetting the timing of the second timing reference signals, the reset signal generating means being responsive to the first timecodes to generate a reset signal in response to a first timecode which, when divided by m, where m/n represents the ratio between the first and second video rates, gives a predetermined remainder.

Preferably the second timing reference generator is responsive to the first timing reference signals to generate the second timing reference signals in order that the second timing reference signals do not drift with respect to the first timing reference signals.

In accordance with another preferred embodiment of the invention, the control means comprises means for generating the first reference signals and the second reference signals, means for identifying a phase relationship between the first and second reference signals, means for causing the first video means to be synchronised with the first reference signals, and means responsive to the second reference signals and the first timecodes to derive the target timecodes fop the second video means.

In this embodiment the means for identifying a phase relationship preferably comprises first counter means for counting timing reference signals for the timing reference having the higher frequency, which first counter means is reset by each timing reference signal of the timing reference having the lower frequency, second counter means for counting the first timing reference signals, and means for resetting the second counter means when the count of the first counter means reaches a predetermined threshold. In a specific embodiment of the invention the predetermined threshold is a count of 2.

Preferably also, there ape provided means responsive to a count of the second counter means and to the first timecodes for synchronising the first video means to the first timing reference, the synchronising means generating speed control signals for varying a playing speed of the first video means until a fixed relationship between the count of the second counter means and the remainder from dividing a current first timecode from the first video means by m is obtained.

In either embodiment of the invention referred to above, the control means comprising means responsive to the target timecodes and to second timecodes from the second video means to synchronise the operation of the second video means, the means for synchronising the operation of the second video means generating speed control signals for varying a playing speed of the second video means until the target timecodes and the second timecodes ape in the correct relationship.

The invention also includes video processing apparatus comprising first and second video means and apparatus as defined above. Each of the first and second video means can be a video storage device such as a video tape recorder.

The invention finds particular, but not exclusive application where the control means is a video standards converter.

In accordance with a second aspect of the invention, there is provided a method of synchronising the operation of a first video means for a first series of video images referenced by means of first timecodes, the first video means being operable at a first video rate in response to first timing reference signals and a second video means for a second series of video images referenced by second timecodes, the second video means being operable at a second video rate in response to second timing reference signals, the method comprising establishing a predetermined phase relationship between the first timecodes from the first video means and second reference signals for the second video means and responding to the first timecodes and the second reference signals for the second video means to derive target timecodes for the second video means for synchronising the second video means.

DESCRIPTION OF THE PREFERRED EMBODIMENTS

Figure 1:
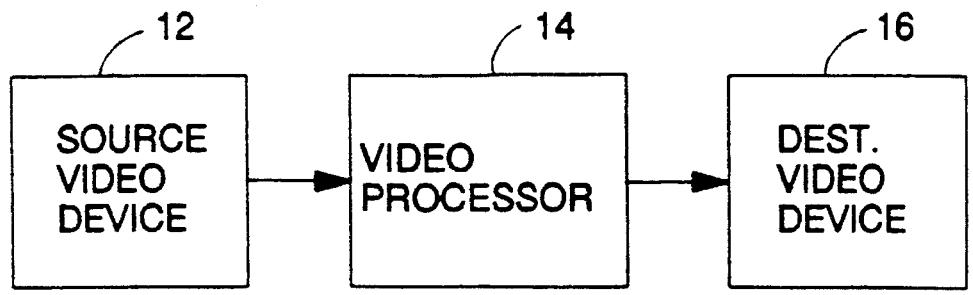
FIG. 1 is a schematic block diagram of a video processing system.

FIG. 1 is a schematic overview of a video processing system 10 comprising a source video device 12 a video processor 14 and a destination video device 16. Typically, the source and destination video devices will be video tape recorders. However, the source and/or destination video device(s) can be some other form of video storage device, or alternatively a video transmission system. Each of the source and destination video devices are controlled by timing references. In a typical video processing system, the references would be a common reference generated by a common reference generator. However, in an embodiment of the present invention, the references represent different timing frequencies.

Figure 2:
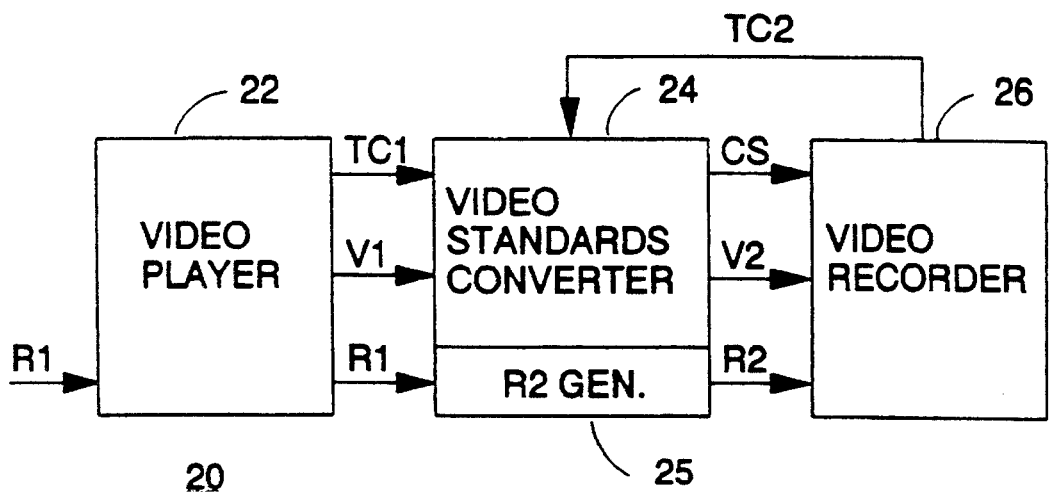
FIG. 2 is a functional block diagram of a first embodiment of the invention.

FIG. 2 is a functional block diagram of a first embodiment 20 of the invention. In this embodiment, a video standards converter 24 receives a first sequence of video images V1 from a video player (eg. a VTR) 22, processes the images and produces a second sequence of video images V2 which are output to a video recorder (eg. a VTR) 26. The video player is controlled by a studio reference signal R1 at 60 Hz. Accordingly, the sequence of video images V1 is output from the video player at a 60 Hz video rate. The reference signal R1 is supplied from the video player 22 (or directly from the studio reference) to a R2 reference generator 25 which, in this embodiment, forms part of the video standards converter 24. Also supplied from the video player 22 to the video standards converter 24 are the timecodes TC1 associated with respective images in the sequence of images V1. The video standards converter 24 also receives timecodes TC2 from the video recorder 26. The R2 reference generator 25 produces a 50 Hz second reference signal R2 for controlling the video recorder 26. In addition to the second sequence of video images V2, the video standards converter 24 also supplies control signals CS to the video recorder for synchronisation purposes as will be explained later.

Figure 3:
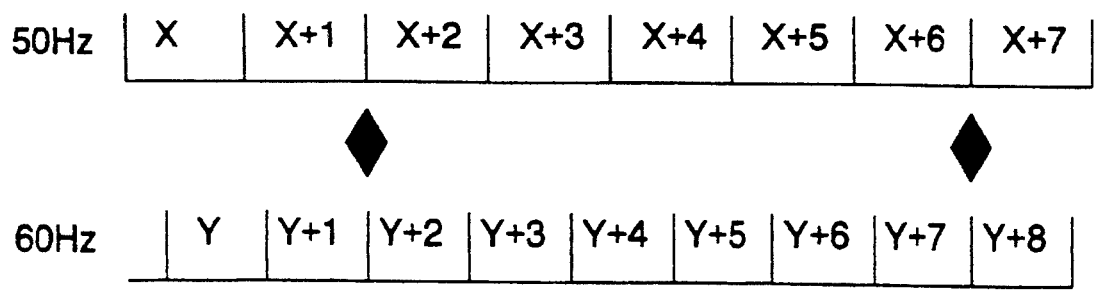
FIG. 3 is a timing diagram for explaining the operation of the first embodiment of the invention.

The difficulty in synchronising the operation of the VTRs 22 and 26 in the embodiment of FIG. 2 results from the fact that they are operating at different frequencies in response to the references R1 and R2. FIG. 3 illustrates the difficulties in synchronisation caused by the varying phase relationship between a sequence of video images at 50 Hz and a sequence of video images at 60 Hz. It can be seen from FIG. 3 that a sequence of 5 images (for example x+2 to x+6) in the 50 Hz sequence corresponds to 6 video images (y+2 to y+7) in the 60 Hz sequence. Comparing the vertical lines in the top, 50 Hz sequence with those in the bottom, 60 Hz, sequence in FIG. 3 will illustrate that the phase relationship between the images in the 50 Hz sequence and those in the 60 Hz sequence changes over a series of 5 images in the 50 Hz sequence and 6 images in the 60 Hz sequence. The diamonds in FIG. 3 illustrate points in the two sequences which are in phase with one another. Once the 50 Hz and the 60 Hz references have been locked together with a given phase relationship for a given pair of images in the 50 Hz and 60 Hz sequences, this phase relationship will repeat after five 50 Hz fields or six 60 Hz fields. However, if editing is to be permitted part way through a pre-recorded sequence of images, the difficulty is to identify the desired phase relationship between a corresponding pair of images from the 50 Hz and 60 Hz sequences in a repeatable manner so that the 50 Hz and 60 Hz sequences can be locked together correctly. If the sequences are not correctly locked together, errors will occur at the edit boundaries.

Figure 4:
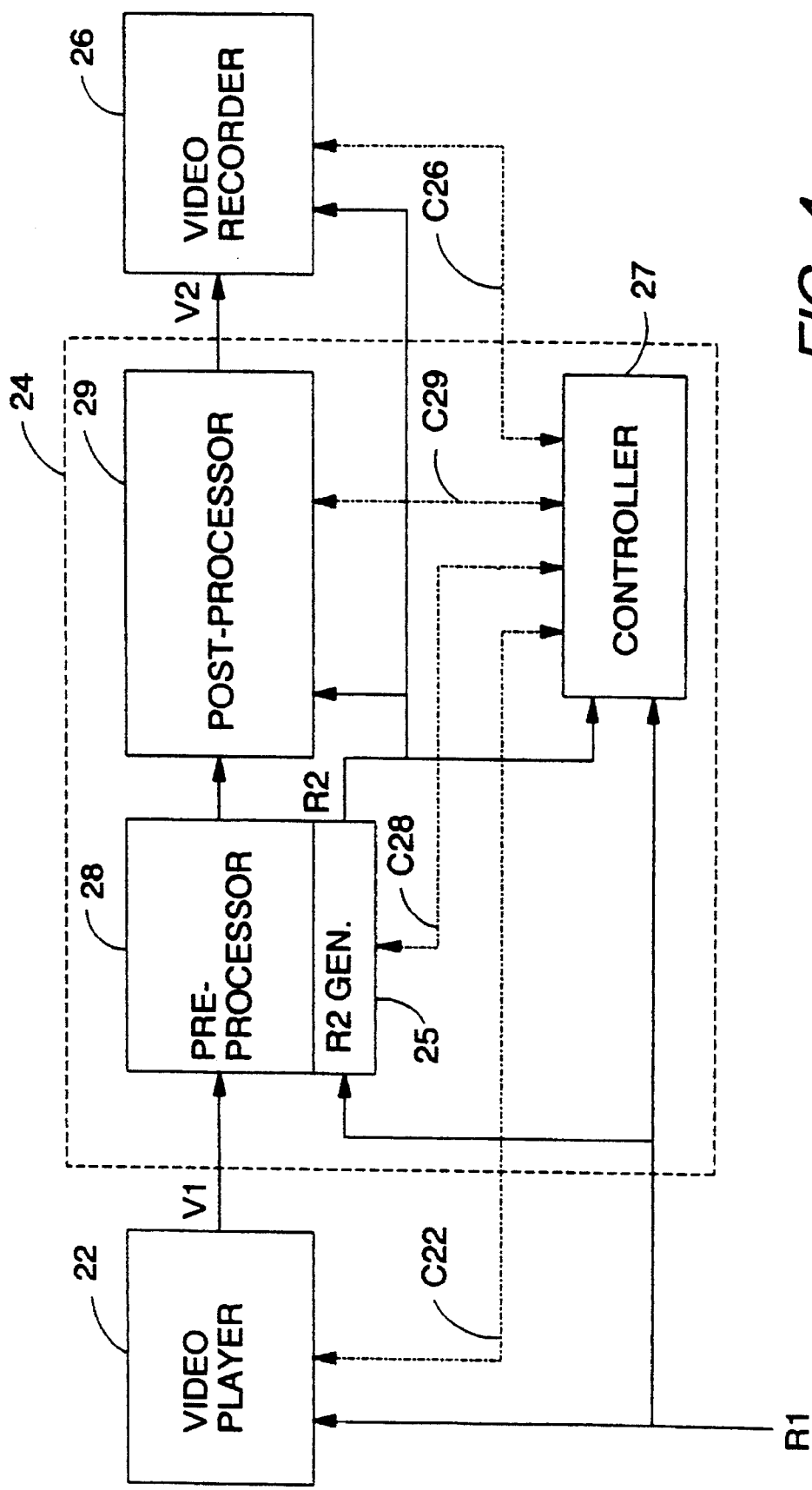
FIG. 4 is a schematic block diagram of a particular implementation of the first embodiment of the invention.

FIG. 4 is a schematic block diagram of a specific embodiment of the invention in the form of a video standards converter 24 for converting images from a first VTR (video player) 22 operating in accordance with a first timing reference R1 for storage on a second VTR (video recorder) 26 operating in accordance with a second timing reference R2.

The details of the video processing are not relevant to the present invention. Moreover, the person skilled in the art will be aware of conventional video standards converters which can perform such processing. Accordingly, only a brief description of the video processing will be given herein. An example of a possible video conversion is from high definition video signals (HDVS) in accordance with a standard of, say, 1125 lines, 60 Hz, and 2:1 interlace to normal definition video signals in accordance with a standard of, say, 625 lines, 50 Hz and 2:1 interlace. In order to perform this conversion, the video standards converter 24 comprises a pre-processor 28, which converts the input video signals to a progressive format (i.e. the 2:1 interlace is removed) in accordance with a motion adaptive interpolation scheme in which interframe interpolation is employed in static picture areas and interfield interpolation is employed on moving material within the picture. This 1125 line, 60 Hz, 1:1 progressive format is then converted to 625 line, 60 Hz, 1:1 format which is then passed to a post-processor 29 which converts from the input frames at the input rate of 60 Hz to output frames at 50 Hz. It will be appreciated that fewer frames are needed at 50 Hz than at 60 Hz. The post-processor computes which input frames are required from the sequence of input video frames in order to generate the output sequence of video frames. Accordingly, in order to generate each output frame, pairs of input frames are selected and then interpolated in accordance with an appropriate interpolation algorithm. In order to compensate for motion within the images, the process of generating an output frame takes account of possible movement of objects within the image, for example, using so-called "vector processing". Details of vector processing for motion compensation in a video standards converter can be found in GB-A-2 213 749.

In the video standards converter, the pre-processor operates in response to the R1 reference and the post-processor operates in response to the R2 reference. In this specific example, the R1 reference is a studio reference and the R2 reference is produced by the reference generator 25 from the R1 reference. The video standards converter 24 also includes a controller 27 which controls the operation of the pre-processor 28 including the reference generator 25 via a control path C28, the operation of the post-processor 29 via a control path C29 and the operation of the video player 22 and video recorder 26 via control paths C22 and C26, respectively. The control paths are used for, inter alia, passing the timecodes TC1 and TC2 and the control signals CS shown in FIG. 2.

In this specific example of the invention, the controller is a personal computer comprising conventional personal computer elements including one or more microprocessors, memory, display and user input devices. Also, in this example of the invention, the control paths C22, C28, C29 and C26 are all implemented by means of standard computer serial connections.

The video player 22, the reference generator 28 and the controller 27 all receive the studio reference R1. The postprocessor 29, the video recorder 26 and the controller 27 all receive the reference R2 from the reference generator 25.

Figure 5:
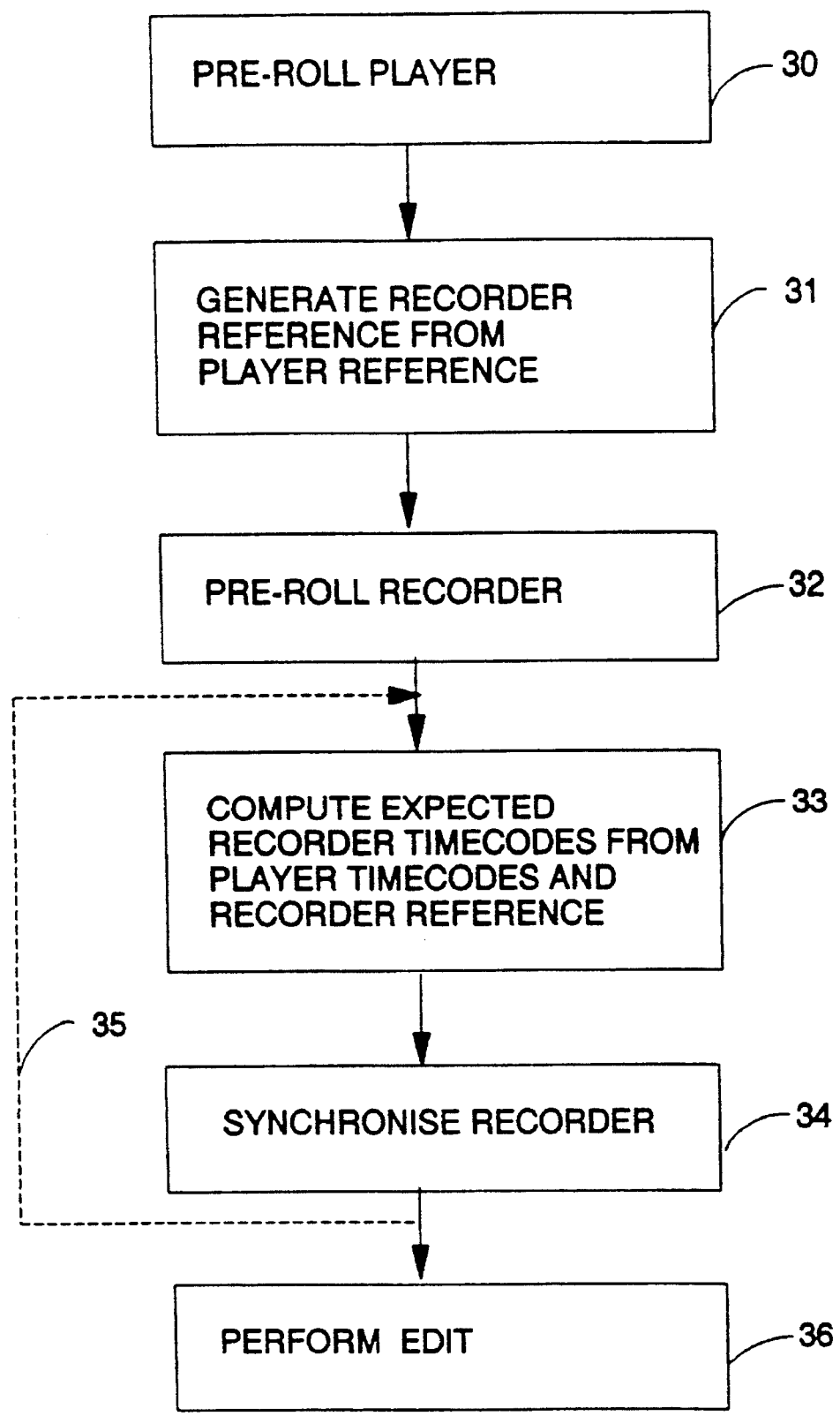
FIG. 5 is a flow diagram illustrating the operation of the first embodiment.

FIG. 5 explains how the system shown in FIG. 4 enables the synchronisation of the video player 22 and the video recorder 26 such that an edit may be performed in a reliable and repeatable manner. In this embodiment both the video player and the video recorder are video tape recorders (VTRs).

In step 30 the video standards converter 24 instructs one of the VTRs (in this example the video player) to pre-roll to a position in the sequence preceding the video images which are to be used to perform the edit. As with the prior art example where both the video player and the video recorder are driven by a common reference, the video player is pre-rolled to a timecode "S1-d1 fields" and switched to a play mode based on the standard studio reference R1. "S1" is the start timecode for the edit sequence on the video player and "d1" is a number of timecodes preceding the start timecode which allows the video player to get up to normal play speed and to lock to the reference R1 before reaching the start timecode S1.

The video standards converter 24 generates (step 31) a video recorder reference R2 for the video recorder 26 using the video player reference R1 such that the record reference R2 has a repeatable phase relationship with respect to the source device timecodes TC1 in a manner to be described later.

The video standards converter instructs (step 32) the video recorder 26 to pre-roll to a timecode "S2-d2 fields" and to enter the play mode. The video recorder 26 spools to the point identified and starts to run based on the reference R2 generated by the video R2 generator 25. "S2" is the start timecode for the edit sequence on the video recorder 26 and "d2" is an appropriate number of timecodes preceding the start timecode to allow the video recorder 26 to get up to normal play speed and to be synchronised to the video player.

Appropriate values of "d1" and "d2" can be established by trial and error for a selected video player and video recorder.

In order to synchronise the running of the video recorder to the video player, it is not possible, as was the case in the prior art, to simply compare the video player and video recorder timecodes as these are running at different rates in response to the references R1 and R2 which are at different frequencies. In accordance with an embodiment of the invention therefore, expected recorder timecodes are computed (step 33) from the player timecodes and the recorder reference in a manner to be described below, and these expected recorder timecodes and are compared (step 34) to the timecodes actually output by the video recorder. If the video player and the video recorder timecodes are not in the correct relationship then the video standards converter 24 sends command signals CS to the video recorder 26 to vary its speed. The steps 33 and 34 of computing expected recorder timecodes, comparing the values of the expected and actual recorder timecodes and varying the speed of the video recorder 26 are repeated (as represented by the feedback path 35) until the timecodes are found to have the correct relationship. At this point, the first and second video recorders are in phase and running with the correct time code relationship for the edit and are then locked to their respective timing references for performing the edit operation (step 36) when the start timecodes have been reached.

In this embodiment of the invention, where a second reference R2 is generated from the studio reference R1, steps 31 and 33 in FIG. 4 ensure that the synchronisation of the video player and recorder is performed in a repeatable manner. This embodiment of the invention recognises that a predetermined number of fields of video in the play sequence will correspond to another predetermined number of fields of video in the record sequence such that the phase relationship between the sequences will repeat in a predetermined manner as illustrated in FIG. 3. Accordingly, to ensure that the synchronisation of the video player and recorder can be performed in a repeatable manner, it is necessary to ensure that steps 31 and 33 are only performed at points in time where the two references have a predetermined phase relationship to each other and to the player timecode. In this embodiment of the invention, the steps 31 and 33 are performed at times based on the video player timecode values. The times chosen depend on the relationship between the two frequencies.

Figure 6:
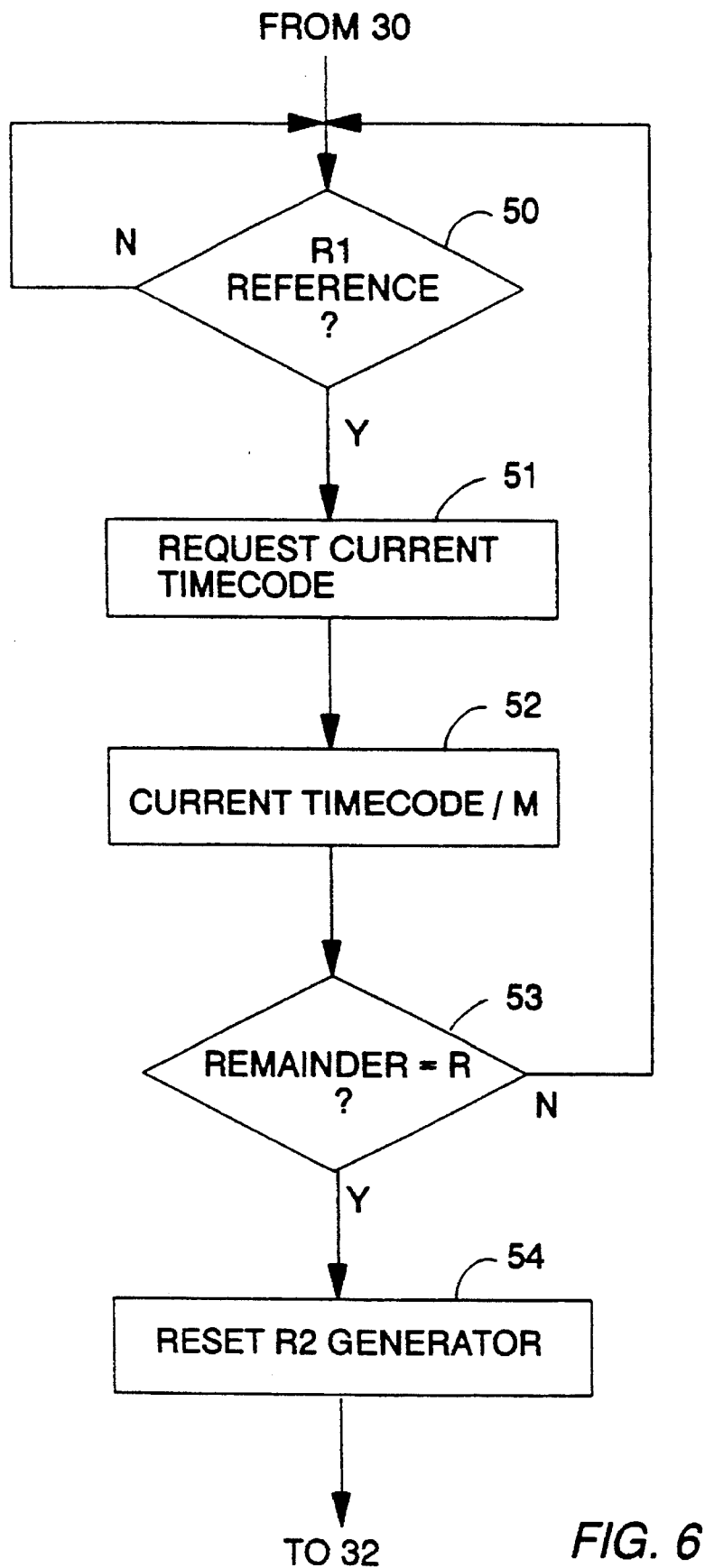
FIG. 6 is a flow diagram illustrating part of FIG. 5 in more detail.

FIG. 6 is a flow diagram illustrating step 31 of FIG. 5 in more detail, that is the generation, by the video standards converter, of the R2 reference for the video player such that there is a known phase relationship between the R2 reference and the R1 reference for any image (field and/or frame) in the player video sequence. This is achieved by resetting the R2 reference generator at predetermined source timecode values.

If we assume that the recorder reference R2 is computed from the player reference R1, where m fields of the video player correspond to n fields of the video recorder, then the resetting of the R2 generator is performed in response to a player timecode which, when divided by m, gives a predetermined remainder. As the phase relationship between the player reference R1 and the recorder reference R2 repeats every m player reference signals, this means that for each timecode which gives that predetermined remainder when divided by m, the player and recorder references R1 and R2 will have the same phase relationship. Also as the phase relationship between the m-1 intervening player video fields changes with respect to the corresponding n-1 recorder video fields in a predetermined manner, the phase relationship between any field in the player video sequence and the recorder video sequence can be established in a repeatable manner.

In the case where reference R1 is at 60 Hz and reference R2 is 50 Hz, then m=6 and n=5. Consider the following example of identifying the remainders for m=6. A timecode value 00.00.00.07 field 0 corresponds to a value of 7 frames or 14 fields. Dividing the 14 by 6 gives a remainder of 2. Similarly, a timecode value 0.00.10.13 field 0 corresponds to a value of (10 times 30) plus 13, this is 313 frames or 626 fields. Dividing 626 by 6 again gives a remainder of 2. The invention recognises that the phase relationship between the player and recorder operations at these timecodes will be the same for timecodes giving the same remainder to this calculation (assuming that both a running at normal, or at least the same speed) and by consistently resetting the R2 reference generator at a timecode giving a desired remainder will enable reliable synchronisation of the player and recorder.

As illustrated in FIG. 6, the controller 27 responds 50 to a R1 reference timing signal to request a timecode 51 from the video player 22 via control path C22. This initial timecode is divided 52 by m in the controller 27 and the remainder is compared 53 to a predetermined value. If the remainder corresponds to the predetermined value then the controller issues 54 a reset signal via control path C28 to the R2 generator 25 causing the R2 generator to be reset (i.e. to force the R2 generator to generate a timing signal). If the remainder does not equal the predetermined remainder, then no reset signal is issued and the next R1 timing signal is awaited in step 50. In the preferred embodiment of the invention where the controller is a personal computer, the logical steps illustrated in FIG. 6 are controlled by software running on the personal computer. However, it will be appreciated that equivalent hardware logic could be employed as will be apparent to one skilled in the art.

Figure 7:
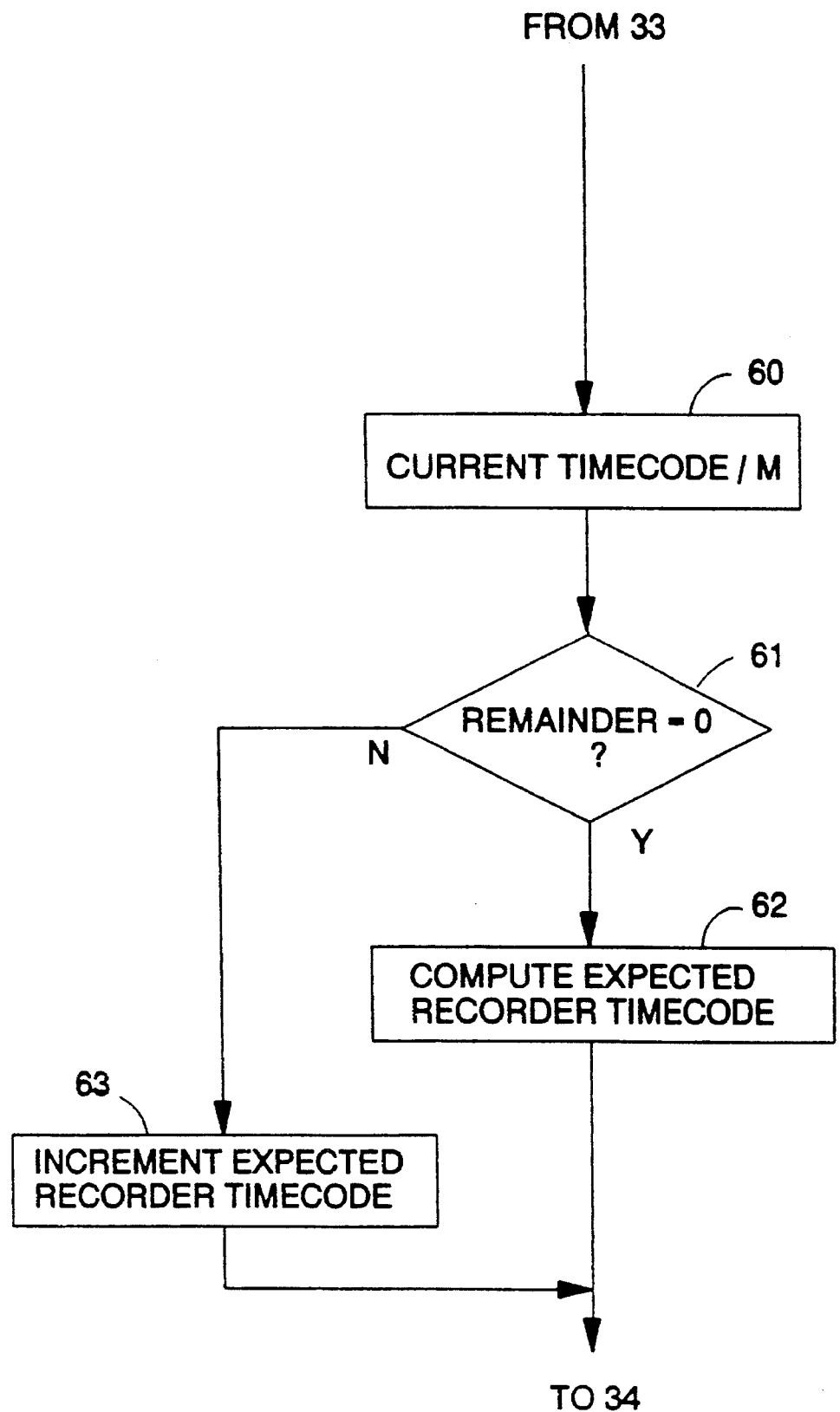
FIG. 7 is a flow diagram illustrating another part of FIG. 5 in more detail.

FIG. 7 is a flow diagram illustrating manner in which the controller performs step 33 of FIG. 5. Once again, in the preferred embodiment of the invention, the logical steps illustrated in FIG. 7 are performed by software running on a personal computer which forms the controller 27, although in other embodiments it will be appreciated that equivalent hardware logic could be employed.

In step 60, the controller divides the current player timecode TC1 by m or a multiple thereof. When (step 61) the current player timecode is an integral multiple of m (i.e. the remainder=0), an expected recorder timecode is computed in step 62 in accordance with the following equation:

$$ERT = SRT + ((SPT - CPT) \times n/m) \quad (1)$$

where: ERT is the Expected Recorder Timecode expressed in fields; SRT is the Start Recorder Timecode expressed in fields (i.e. the timecode in the recorder video sequence at which the edit should start); SPT is the Start Player Timecode expressed in fields (i.e. the timecode in the recorder video sequence at which the edit should start); CPT is the Current Player Timecode expressed in fields (i.e. the current player timecode); and m and n are the numbers of fields in the player sequence and recorder sequence over which the phase relationship cycle repeats.

The current player timecode is obtained by the controller 27 via the control path C22 from the video player 22. The values of the start recorder timecode and the start player timecode will be input to the controller 27 by the user and will be retained in the controller memory.

Control is then passed to step 34 of FIG. 5 to compare the expected recorder timecode to the actual recorder timecode and, where necessary to modify the speed of the video recorder as will be explained with reference to FIG. 8.

If in step 61 it is determined that the player timecode TC1 is not an integral multiple of m, control passes to step 63 where the expected recorder timecode is incremented in response to the next player reference signal E1. Control then passes to step 34 of FIG. 5.

Figure 8:
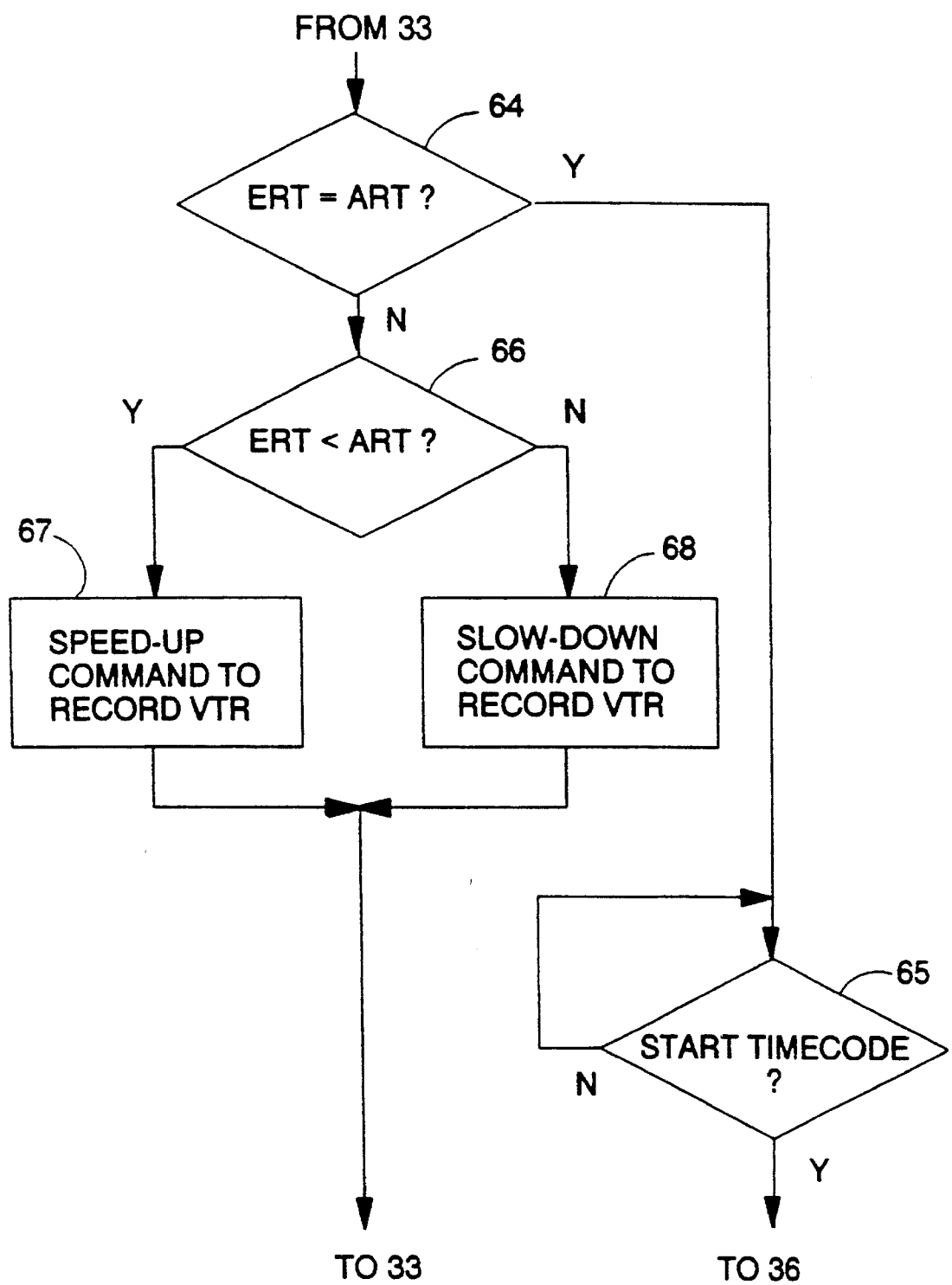
FIG. 8 is a flow diagram illustrating a further part of FIG. 5 in more detail.

With reference to FIG. 8, in step 64, if the expected recorder timecode ERT is identical with and in phase with the actual recorder timecode ART, and the recorder and player are both at normal speed, then control passes to step 65 until the initial edit timecodes are reached at which point the video standards converter issues control signals to the video player 22 and video recorder 26 to start the edit operations in step 36 (FIG. 5) with the player in play mode and the recorder in record mode.

If, however, in step 64 a discrepancy between the timecodes is detected, then, dependent upon whether the expected recorder timecodes are in advance of or behind the actual recorder timecodes (step 66), control signals are issued by the controller 27 via control path C26 to either increase 67 or decrease 68 the speed of the video recorder 26 in order to reduce the discrepancy. Control is then returned to step 33 of FIG. 5.

This first embodiment of the invention enables an edit operation to be performed repeatedly and in a reliable manner where a studio timing reference is provided and a timing generator which can be reset is available fop generating the R2 reference from the R1 reference. However, a standard studio reference may not always be available. Accordingly a second embodiment of the invention will now be described where both the R1 and R2 references are generated in the video standards converter. It will be appreciated that a separate generator fop the R1 and R2 references could be provided.

Figure 9:
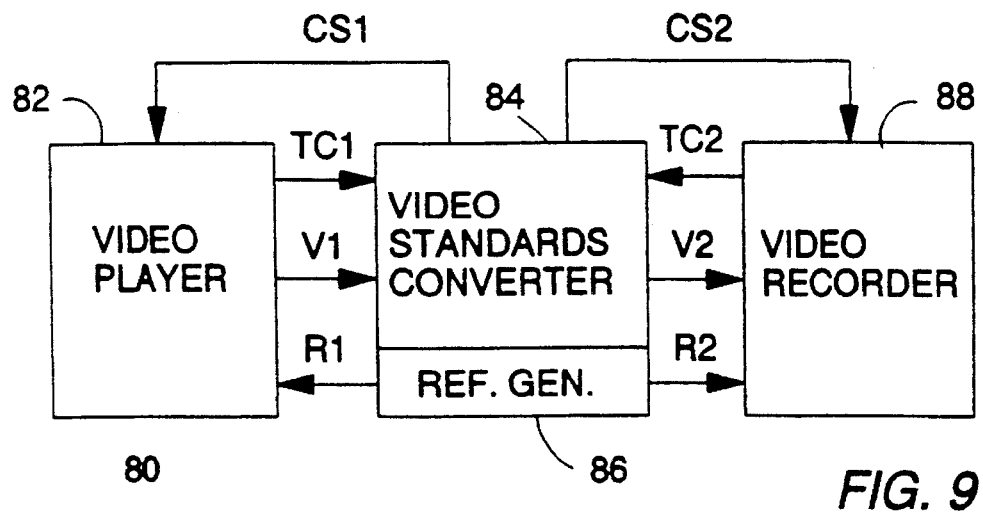
FIG. 9 is a functional block diagram of a second embodiment of the invention.

FIG. 9 is a functional block diagram of the second embodiment 80 of the invention. This embodiment includes its own reference generator 86 for generating both the R1 and R2 references. Thus, in this embodiment, it is not necessary to have an external studio reference.

In this embodiment, a video standards converter 84 receives a first sequence of video images V1 from a video player (e.g. a VTR) 82, processes the images and produces a second sequence of video images V2 which are output to a video recorder (e.g. a VTR) 26. The reference generator 86 generates both the R1 and R2 references, which are supplied to the video player 82 and the video recorder 88, respectively. In addition to the video signals V1, the video standards converter 84 receives timecodes TC1 from the video player 82. The video standards converter 84 also receives timecodes TC2 from the video recorder 88. The video standards converter outputs speed control signals CS1 and CS2 to the video player 82 and the video recorder 88, respectively.

As with the first embodiment, the difficulty in synchronizing the operation of the VTRs 82 and 88 results from the fact that they are operating at different frequencies in response to the references R1 and R2. In the case of this embodiment, the references R1 and R2 are related to one another as they are generated by a common reference generator. However, the problem still remains of synchronising the operations of the video player 82 and the video recorder 88 in a manner which enables a desired phase relationship between the player and recorder timecodes to be established so that edit operations can be performed reliably.

Figure 10:
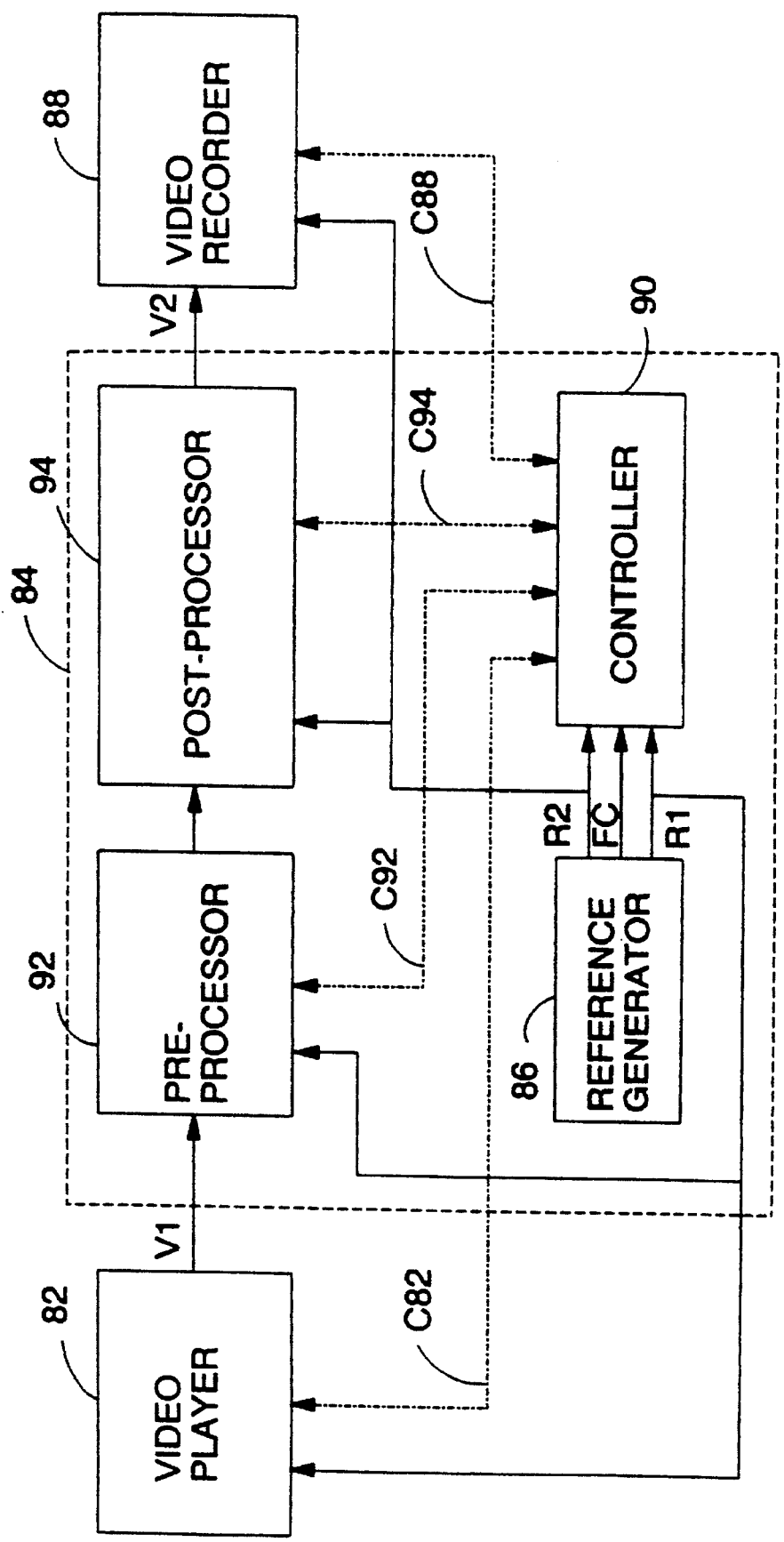
FIG. 10 is a schematic block diagram of a particular implementation of the second embodiment.

FIG. 10 is a schematic block diagram of a particular implementation of the embodiment of FIG. 9. The embodiment of FIG. 10 is generally similar to that of FIG. 4 with the exception that the reference generator 86 is provided which generates both the R1 and R2 references, rather than a reference generator which generates the reference R2 from a studio reference. The reference generator 86 in FIG. 10 outputs the references R1, R2 and a field count value FC.

In the video standard converter 84, the preprocessor 92, which corresponds generally to the pre-processor 28 of FIG. 4, operates in response to the R1 reference and the post-processor 94, which corresponds generally to the post-processor 29 in FIG. 4, operates in response to the R2 generator. The video standards converter 84 includes a controller 90 which controls the operation of the pre-processor 92 via a control path C92, the operation of the post-processor 94 via a control path C94 and the operation of the video player 82 and the video recorder 88 via control paths C82 and C88, respectively. The control paths are used, inter alia, for passing the timecodes TC1 and TC2 and the control signals CS1 and CS2 shown in FIG. 8. As in the previous example, the controller is a personal computer comprising conventional personal computer elements including one or more microprocessors, memory, display and user input devices. Also, as in the first embodiment, the control paths C82, C92, C94, C88 are all implemented by means of standard computer serial connections. The reference generator 86 is shown external to the controller 90. However, the reference generator 86 may be implemented as part of the controller 90, or the pre-processor or post-processor, for example on a dedicated printed circuit board.

Figure 11:
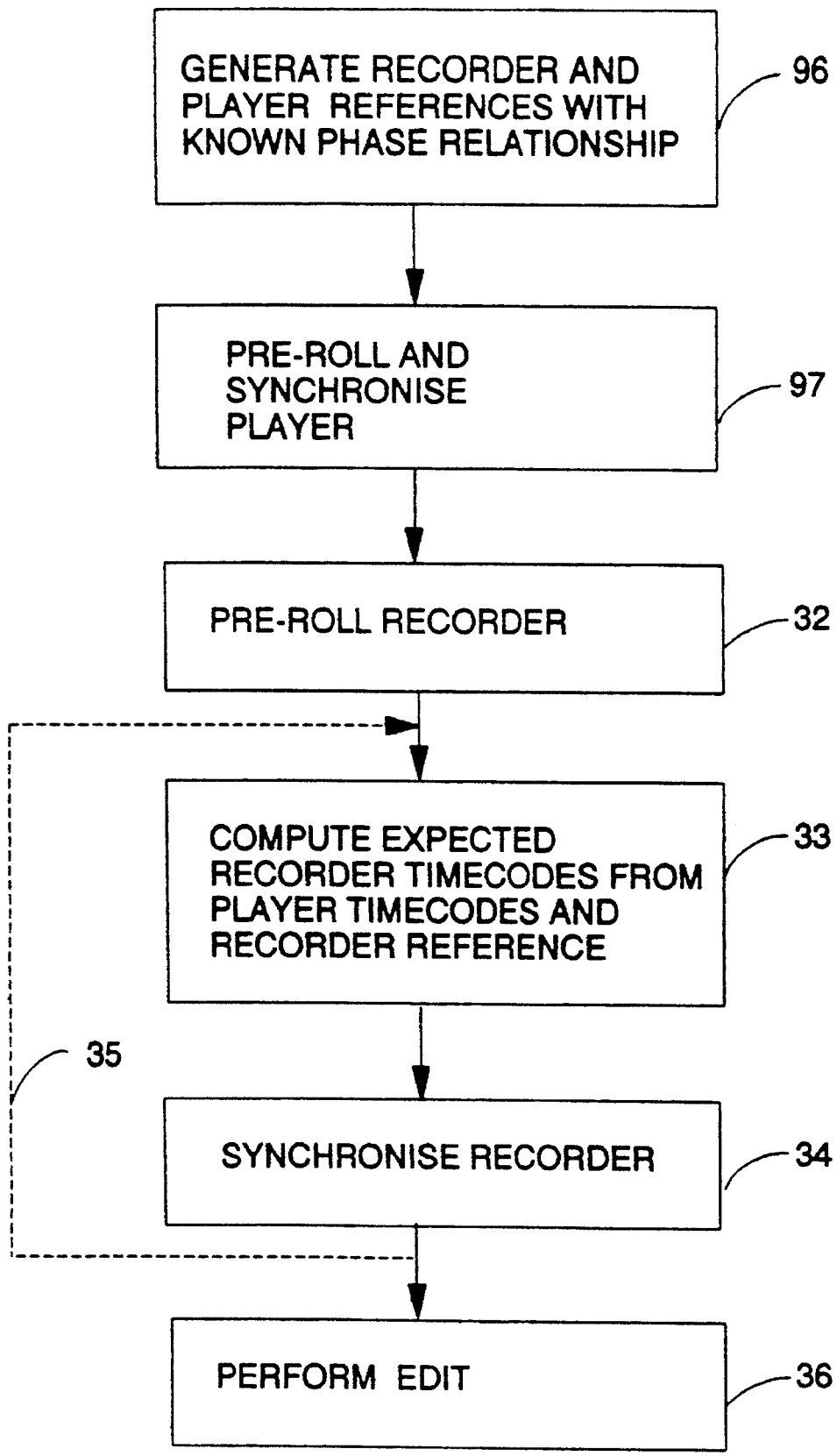
FIG. 11 is a flow diagram illustrating the operation of the second embodiment.

FIG. 11 is a flow diagram illustrating the operation of the second embodiment of the invention. The first step 96 in the process is to determine the phase relationship between the reference signals R1 and R2. The way in which this can be done is explained in more detail with reference to FIGS. 12 and 13 hereinafter. Once the phase relationship between the first and second references R1 and R2 is known, the video standards converter then issues instructions in step 97 to one of the video devices (in this embodiment the video player 82) to pre-roll to a certain position and to synchronise that player. This step is explained in more detail with reference to FIG. 14 below. Once the video player has been synchronised to the reference R1, the remaining steps in the process, namely steps 32, 33, 34 and 36 correspond to the like numbered steps described in FIG. 5 for the first embodiment of the invention. Accordingly, the description of these steps will not be repeated herein.

Figure 12:
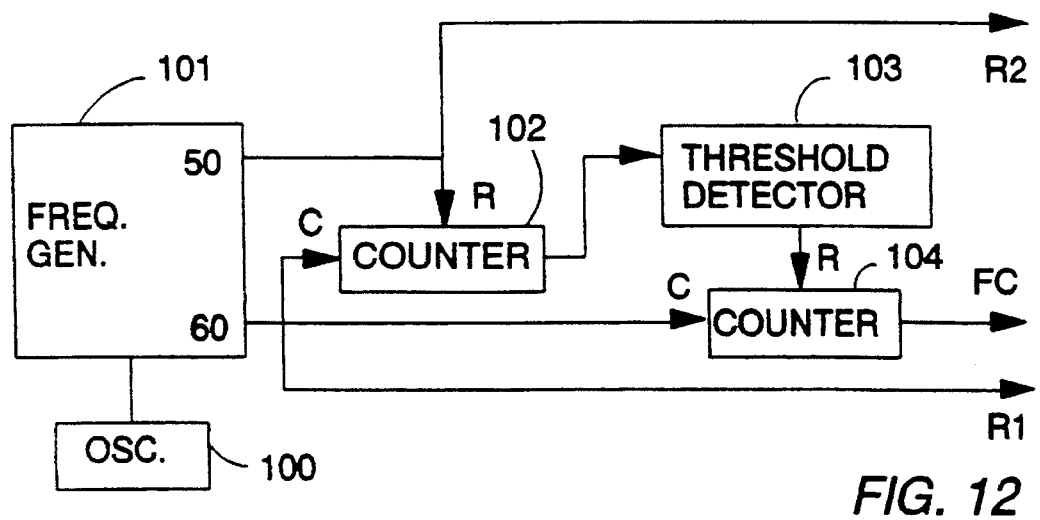
FIG. 12 is a functional block diagram illustrating part of the second embodiment.
Figure 13:
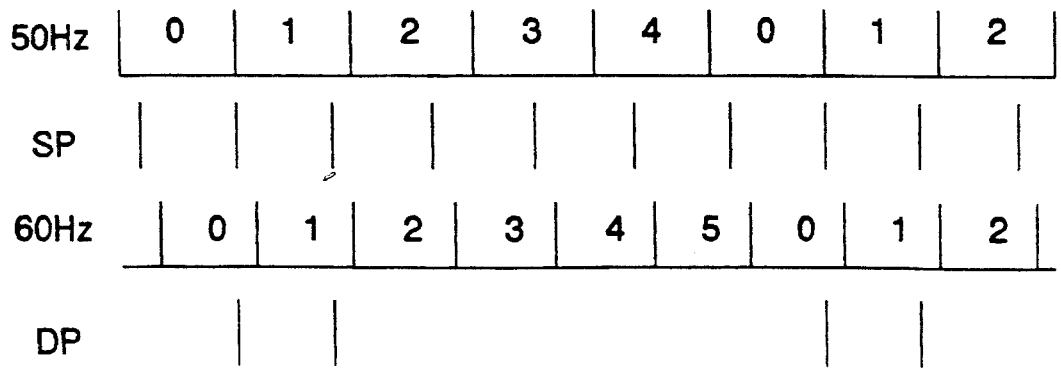
FIG. 13 is a timing diagram for explaining the operation of the second embodiment.

Turning now to FIG. 12 and 13, an explanation of the step of determining the phase relationship between the player and recorded references R1 and R2 will now be described.

FIG. 12 is a functional block diagram of means for determining the phase relationship between the video player reference R1 and the video recorder reference R2. An oscillator 100 generates a basic frequency which, in a frequency generator 101 is converted to form the references R1 and R2. In this particular embodiment, reference R1 is a 60 Hz reference signal and reference R2 is a 50 Hz reference signal. In the present embodiment it is assumed that the video player operates in response to the reference signal having the higher frequency, namely reference R1. The video recorder reference R2 represents a 50 Hz reference signal. The output of the higher frequency reference R1 is input to the count input of a counter 102. The lower frequency reference R2 is input to a reset input of the counter 102. Accordingly, the counter 102 is incremented each time a R1 reference signal is generated and is reset each time a R2 reference signal is generated by the frequency generator 101.

FIG. 13 is a timing diagram representing the relationship between a lower reference of 50 Hz and a higher reference of 60 Hz. The second line in FIG. 13 represents the sample points of the 60 Hz signals represented by the count in the counter 102. Because of counting delays, the count in the counter 102 will normally be incremented with a delay as represented by the second line (labelled SP for sample point) in FIG. 13. As the counter 102 is reset with each 50 Hz clock signal, the counter 102 will normally only count to 1 before being reset to 0. However, for one period in 5 of the 50 Hz signal, the counter will reach 2.

In more general terms, where the higher frequency is at a multiple of x Hz, where x is a positive integer, and the lower frequency is a multiple of y Hz, where y is also a positive integer, and where x−y=1, the counter 102 will count to 1 for y−1 of y of the lower frequency count signals and will count to 2 for 1 of the y lower frequency count signals. By providing a threshold detector 103 to detect the counter 102 counting to the value 2, it is possible to identify a position in the count cycle for the higher and lower frequency references with a predetermined phase relationship. In FIG. 13, this position is indicated by the double lines representing the count of 2 in the bottom line of that Figure (labelled DP for data point).

The output of the threshold detector 103 can be used to reset a counter 104 which counts reference signals for the one of the reference frequencies (here the 60 Hz reference). The result of resetting the counter 104 when the threshold detector 103 detects a count of 2 in the counter 102 is to cause the counter 104 to output, sequentially, field count values FC from 0 to 5.

By referring to the count output from the counter 104, it is possible to identify a particular point in the cycle of the changing phase relationships between the higher and lower frequency references. In other words, for any particular value between 0 and 5, the phase relationship between the higher frequency reference signal for that value and the corresponding lower frequency reference will be known as the phase relationship between the higher frequency and lower frequency signals changes in a known manner.

Once the phase relationship is known, either the video player 82 or the video recorder needs to be synchronised to the corresponding reference signal R1 or R2. With the arrangement shown in FIG. 12, where the count is output from the reference E1, it is the video player which is synchronised to the video reference R1 as the series of counts 0 to 5 is known. If it were intended to synchronise the video recorder 88 which operates at the R2 reference, it would then be necessary to count the reference R2 (i.e. here the 50 Hz frequency) with the counter 104.

FIG. 12 represents the counters 102 and 104 and the threshold detector 103 in logical block form as part of the reference generator 86 of FIG. 10. However, it will be appreciated that the functions of the counters 102 and the threshold detector 103 could equally well be implemented in software running on the personal computer which forms the controller 90, with the reference generator 86 simply providing the references. R1 and R2 to the personal computer.

Figure 14:
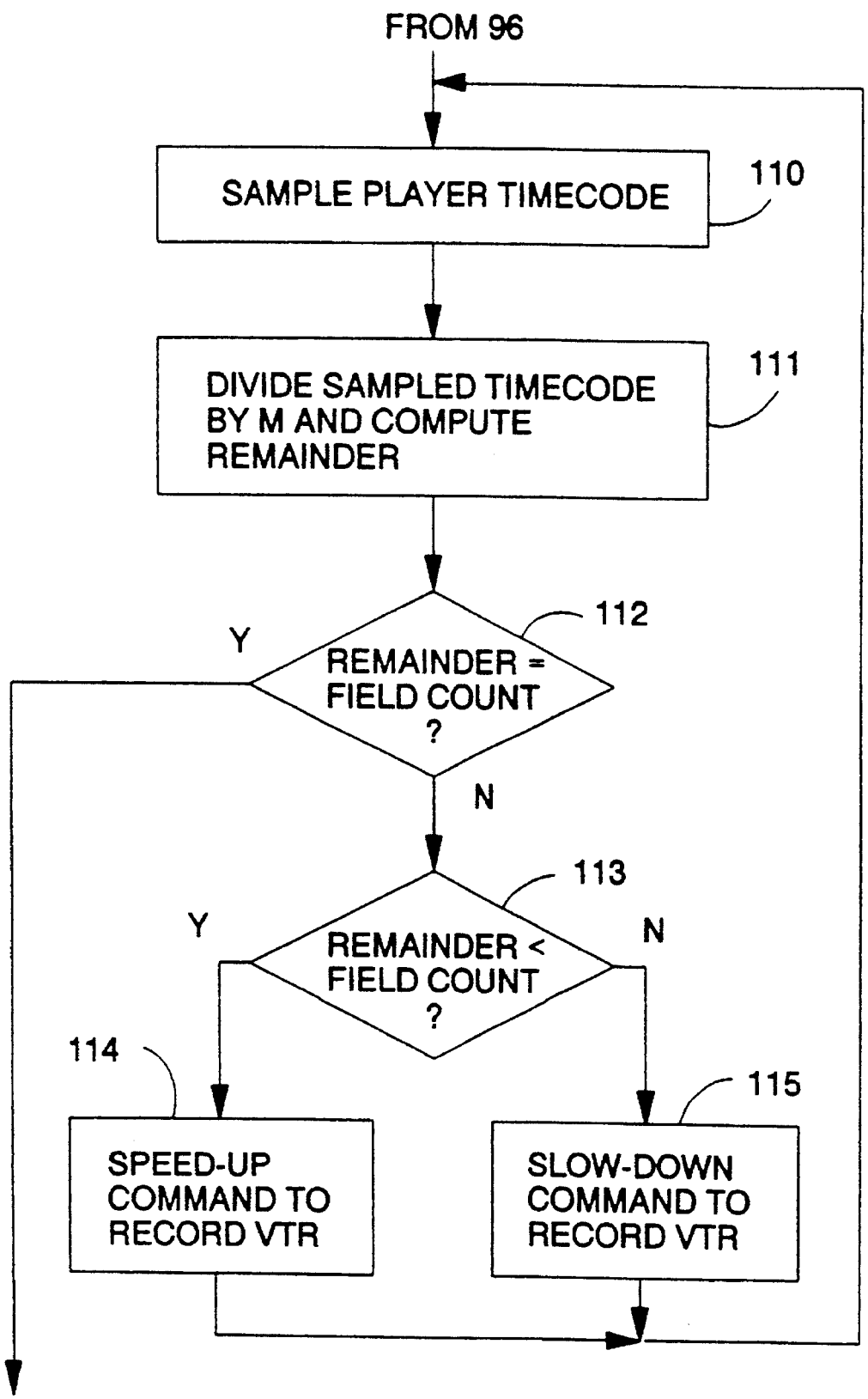
FIG. 14 is a flow diagram illustrating part of FIG. 11 in more detail.

FIG. 14 illustrates the process for synchronising the video player to the reference signals R1. In step 110, the controller 90 samples the current player timecode via the control connection C82. In step 111 the controller 90 divides the sampled timecode by m and computes the remainder of the division. If, in step 112 the controller determines that the remainder equals the field count FC output by the counter 104, the video player is determined to be synchronised with the reference R1 and control passes to step 32.

If, in step 113 the controller 90 determines that the remainder is less than the field count FC, the controller issues 114 speed up commands to the video player via the control path C82. Alternatively, if the controller determines in step 113 that the remainder is greater than the field count, then the controller 90 issues 115 slow down commands to the video player via the control connection C82. After issuing speed up, or slow down commands, control returns to step 110 to sample a further player timecode. This process continues until the remainder is determined to be equal to the field count with the video player at normal playing speed at which time control is passed to step 32 in FIG. 11.

As illustrated in FIG. 14, each player timecode is sampled. However, this is not necessary and, alternatively, only selected player timecodes may be sampled.

Also, in step 112, a test is made whether the remainder is equal to the field count. Alternatively, a test may be made whether the remainder differs from the field count by a predetermined amount. Either way, it is important that the same test is applied each time an edit is to be performed in order that the operation of the video player can be synchronised to the first reference in a repeatable manner.

Two embodiments of the invention have been described for enabling the synchronisation of a first video device and a second video device to timing reference signals such that processing using timecodes may be performed in a reliable and repeatable manner. Through the use of the present invention, re-editing of a video sequence may be performed in a reliable manner even when the video player and video recorder are operating at different frequencies. This is achieved by ensuring that the phase relationship between the two references with respect to two sets of timecode values remains the same. Although two specific embodiments have been described, it will be appreciated that the present invention is not limited thereto.

For example, in the above embodiment, the synchronisation of the video player to the timing references is performed before synchronisation of the video recorder. The video player can thus be thought of as a sort of master device. However, it would equally be possible to synchronise the video recorder to the timing references before synchronising the video player so that the video recorder operates as a master. Also, in the specific embodiments described above, the video player is responsive to reference signals having a higher frequency than those to which the video recorder is responsive. It will be appreciated that this situation could equally be reversed. Moreover, in the above embodiments, reference is made to a video player and a video recorder. Although in the context of editing operations, these will normally be provided off-line so that a playback device such as a VTR and a recording device such as a second VTR would be used, the invention is not limited to use with player and recorder devices. In general, other video devices which operate in response to timecodes may be used. Accordingly, the source device may be a video capture device, a video generator, or a video transmission system. Likewise, the destination device may be a video display or transmission system.

In the above embodiments, where the controller is a personal computer, the logical steps illustrated in the flow diagrams are implemented using software running on the personal computer. However, it will be appreciated that equivalent hardware logic could be employed as will be apparent to one skilled in the art.

Thus, there has been described, means for synchronising the operation of first and second video devices referenced by respective timecodes and operable at different video rates in response to first and second timing references where the first video rate is a m/n times the second video rate. A predetermined phase relationship is established between the first timecodes from the first video means and second reference signals for the second video means and then target timecodes for synchronising the second video device are derived from the first timecodes and the second reference signals. In this manner reliable synchronisation between the first and second video means is possible in order that edit operations may be performed reliably and accurately.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for synchronizing the operation of a first video means to the operation of a second video means, the first video means operating on a first series of video images having locations referenced by first timecodes and operating at a first video rate in response to first timing reference signals, the second video means operating on a second series of video images having locations referenced by second timecodes and operating at a second video rate in response to second timing reference signals, said apparatus comprising:

means for controlling a phase relationship between said first video means and said second timing reference signals, said means for controlling including means for generating said first timing reference signals and said second timing reference signals, means for determining a phase relationship between said first and second timing reference signals including first counter means for counting timing reference signals for a respective one of said first and second timing reference signals having a higher frequency, said first counter means being reset by each timing reference signal of a respective one of said first and second timing reference signals having a lower frequency, second counter means for counting said respective one of said first and second timing reference signals having said lower frequency and means for resetting said second counter means when said count of said first counter means reaches a predetermined threshold value, and means for synchronizing said first video means with said first timing reference signals as a function of said phase relationship between said first and second timing reference signals; and means for generating target timecodes as a function of said first timecodes and said first timing reference signals, said target timecodes being compared with said second timecodes to synchronize said second video means.

2. Apparatus as claimed in claim 1, wherein said predetermined threshold value is a count of 2.

3. Apparatus as claimed in claim 1, wherein said means for synchronizing said first video means calculates a remainder by dividing a current one of said first timecodes by m, where m/n represents the ratio between said first and second video rates, and generates first speed control signals for varying a playing speed of said first video means to obtain a predetermined relationship between the count of said second counter means and said remainder.

4. Video processing apparatus comprising:

first video means for operating on a first series of video images having locations referenced by first timecodes and at a first video rate in response to first timing reference signals;

second video means for operating on a second series of video images having locations referenced by second timecodes and at a second video rate in response to second timing reference signals; and means for controlling a phase relationship between said first video means and said second timing reference signals, for generating target timecodes representing an expected value of said second timecodes, said target timecodes being generated as a function of a current value of said first timecodes, an initial value of said first timecodes and an initial value of said second timecodes upon occurrence of a predefined condition and as a function of said first timing reference signals when said predefined condition does not occur, said target timecodes being compared with said second timecodes to synchronize said second video means, and for varying a playing speed of said second video means so that said second timecodes and said target timecodes are substantially equal.

5. Apparatus as claimed in claim 4 wherein the first video means is a video storage device.

6. Apparatus as claimed in claim 4 wherein the second video means is a video storage device.

7. Apparatus as claimed in claim 4 wherein at least one said video means is a video tape recorder.

8. Apparatus as claimed in claim 4, wherein the means for controlling is a video standards converter.

9. Apparatus as claimed in claim 4, wherein said means for controlling comprises:

means for generating said first timing reference signals and said second timing reference signals, means for determining a phase relationship between said first and second timing reference signals, and means for synchronizing said first video means with said first timing reference signals as a function of said phase relationship between said first and second timing reference signals.

10. Apparatus as claimed in claim 4, wherein said means for controlling generates a current value of said target timecodes from said current value of said first timecodes, said initial value of said first timecodes, said initial value of said second timecodes and a ratio between said first and second video rates when said predefined condition occurs and generates a current value of said target timecodes by incrementing a prior value of said target timecodes as a function of said first timing reference signals when said predefined condition does not occur; and generates second speed control signals for varying said playing speed of said second video means.

11. Apparatus as claimed in claim 4, wherein said predefined condition occurs when a remainder formed by dividing said current value of said first timecodes by m equals a predetermined value, where m/n represents the ratio between said first and second video rates.

12. Apparatus for synchronizing the operation of a first video means to the operation of a second video means, the first video means operating on a first series of video images having locations referenced by first timecodes and operating at a first video rate in response to first timing reference signals, the second video means operating on a second series of video images having locations referenced by second timecodes and operating at a second video rate in response to second timing reference signals, said apparatus comprising:

means for controlling a phase relationship between said first video means and said second timing reference signals; and means for generating target timecodes representing an expected value of said second timecodes, said target timecodes being generated as a function of a current value of said first timecodes, an initial value of said first timecodes and an initial value of said second timecodes upon occurrence of a predefined condition and being generated as a function of said first timing reference signals when said predefined condition does not occur, said target timecodes being compared with said second timecodes to synchronize said second video means, and for varying a playing speed of said second video means so that said second timecodes and said target timecodes are substantially equal.

13. Apparatus as claimed in claim 12, wherein said means for controlling comprises:

means for generating said first timing reference signals and said second timing reference signals, means for determining a phase relationship between said first and second timing reference signals, and means for synchronizing said first video means with said first timing reference signals as a function of said phase relationship between said first and second timing reference signals.

14. Apparatus as claimed in claim 12, wherein one of the first video rate and the second video rate is 60 Hz and the other of the first video rate and the second video rate is 50 Hz.

15. Apparatus as claimed in claim 12, wherein said means for controlling controls a phase relationship between said first timecodes and said second timing reference signals such that said second timing reference signals have a repeated, fixed phase relationship with selected ones of said first timecodes.

16. Apparatus as claimed in claim 12, wherein said means for controlling comprises:

a reference signal generator for generating said second timing reference signals and means for generating a reset signal for resetting said reference signal generator to generate said second timing reference signals when the division of a current one of said first timecodes by m, where m/n represents the ratio between the first and second video rates, produces a predetermined remainder.

17. Apparatus as claimed in claim 12, wherein said means for generating target timecodes generates a current value of said target timecodes from said current value of said first timecodes, said initial value of said first timecodes, said initial value of said second timecodes and a ratio between said first and second video rates when said predefined condition occurs and generates a current value of said target timecodes by incrementing a prior value of said target timecodes as a function of said first timing reference signals when said predefined condition does not occur.

18. Apparatus as claimed in claim 17, wherein said means for generating target timecodes generates second speed control signals for varying said playing speed of said second video means.

19. Apparatus as claimed in claim 12, wherein said predefined condition occurs when a remainder formed by dividing said current value of said first timecodes by m equals a predetermined value, where m/n represents the ratio between said first and second video rates.

20. A method of synchronizing the operation of a first video means to the operation of a second video means, the first video means operating on a first series of video images having locations referenced by first timecodes and operating at a first video rate in response to first timing reference signals, the second video means operating on a second series of video images having locations referenced by second timecodes and operating at a second video rate in response to second timing reference signals, said method comprising:

controlling a phase relationship between said first video means and said second timing reference signals;

generating target timecodes representing an expected value of said second timecodes, said target timecodes being generated as a function of a current value of said first timecodes, an initial value of said first timecodes and an initial value of said second timecodes upon occurrence of a predefined condition and as a function of said first timing reference signals when said predefined condition does not occur;

comparing said target timecodes with said second timecodes to synchronize said second video means;

and varying a playing speed of said second video means so that said second timecodes and said target timecodes are substantially equal.

21. A method as claimed in claim 20, wherein said step of controlling a phase relationship comprises:

generating said first timing reference signals and said second timing reference signals, determining a phase relationship between said first and second timing reference signals, and synchronizing said first video means with said first timing reference signals as a function of said phase relationship between said first and second timing reference signals.

22. A method as claimed in claim 20, wherein said step of controlling a phase relationship comprises controlling a phase relationship between said first timecodes and said second timing reference signals such that said second timing reference signals have a repeated, fixed phase relationship with selected ones of said first timecodes.

23. A method as claimed in claim 20, wherein said step of controlling a phase relationship comprises generating a reset signal for resetting the timing of said second timing reference signals when the division of a current one of said first timecodes by m, where m/n represents the ratio between the first and second video rates, produces a predetermined remainder.

24. A method as claimed in claim 20, wherein said step of generating target timecodes includes generating a current value of said target timecodes from said current value of said first timecodes, said initial value of said first timecodes, said initial value of said second timecodes and a ratio between said first and second video rates when said predefined condition occurs and generates a current value of said target timecodes by incrementing a prior value of said target timecodes as a function of said first timing reference signals when said predefined condition does not occur; and generates second speed control signals for varying said playing speed of said second video means.

25. A method as claimed in claim 24, wherein said step of varying a playing speed includes generating second speed control signals for varying said playing speed of said second video means to obtain said predetermined relationship between a current one of said second timecodes and said current value of said target timecodes.

26. A method as claimed in claim 20, wherein said predefined condition occurs when a remainder formed by dividing said current value of said first timecodes by m equals a predetermined value, where m/n represents the ratio between said first and second video rates.

27. A method of synchronizing the operation of a first video means to the operation of a second video means, the first video means operating on a first series of video images having locations referenced by first timecodes and operating at a first video rate in response to first timing reference signals, the second video means operating on a second series of video images having locations referenced by second timecodes and operating at a second video rate in response to second timing reference signals, said method comprising:

controlling a phase relationship between said first video means and said second timing reference signals, said step of controlling a phase relationship comprising:

generating said first timing reference signals and said second timing reference signals, determining a phase relationship between said first and second timing reference signals, said step of determining a phase relationship between said first and second timing reference signals including counting timing reference signals for a respective one of said first and second timing reference signals having a higher frequency, resetting the count of said timing reference signals having said higher frequency by each respective one of said first and second timing reference signals having a lower frequency, counting said timing reference signals having said lower frequency, and resetting the count of said timing reference signals having said lower frequency when said count of said timing reference signals having said higher frequency reach a predetermined threshold value, and synchronizing said first video means with said first timing reference signals as a function of said phase relationship between said first and second timing reference signals;

generating target timecodes as a function of said first timecodes and said first timing reference signals; and comparing said target timecodes with said second timecodes to synchronize said second video means.

28. A method as claimed in claim 27, wherein the predetermined threshold value is a count of 2.

29. A method as claimed in claim 27, wherein said step of synchronizing said first video means includes calculating a remainder by dividing a current one of said first timecodes by m, where m/n represents the ratio between said first and second video rates, and generating first speed control signals for varying a playing speed of said first video means to obtain a predetermined relationship between the count of said timing reference signals having said lower frequency and said remainder.

* * * * *